Figures 1, 2:
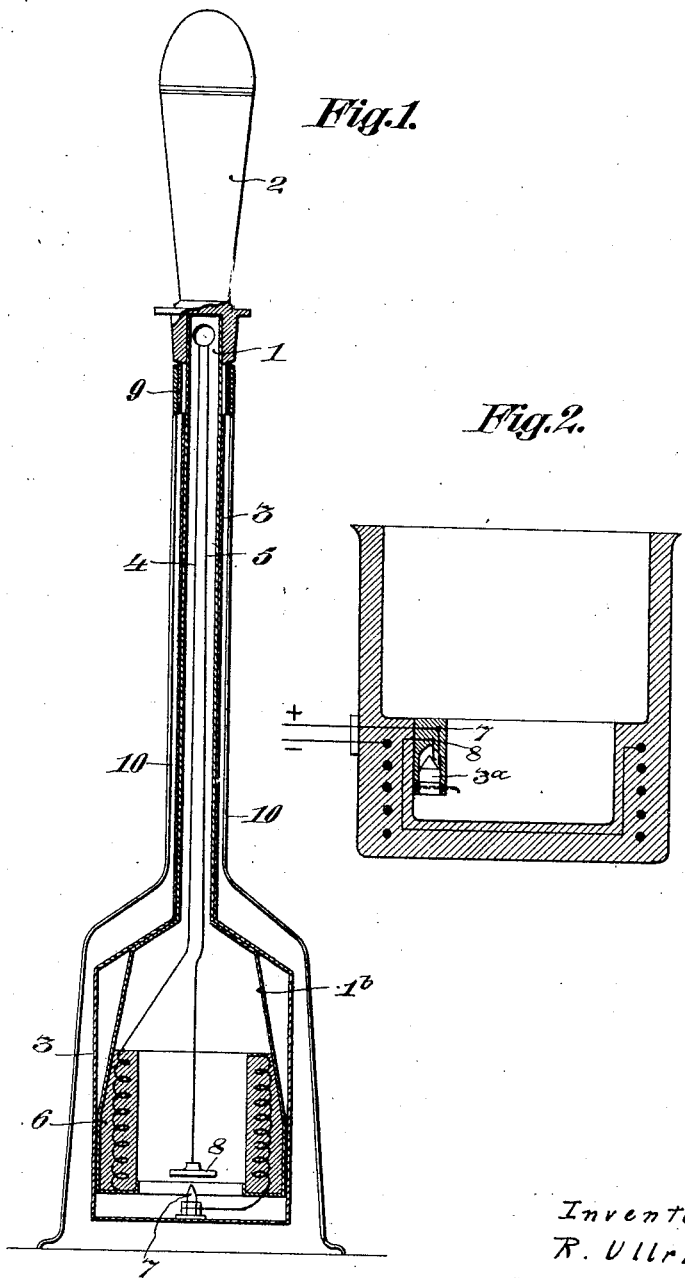

Apr. 10, 1923. 1,451,636

R. ULLRICH

ELECTRIC HEATER

Filed Sept. 12, 1922

Inventor
R. Ullrich
By
Langner, Parry, Card + Langner
Attys.

Patented Apr. 10, 1923.

1,451,636

UNITED STATES PATENT OFFICE.

RICHARD ULLRICH, OF WELS, AUSTRIA.

ELECTRIC HEATER.

Application filed September 12, 1922. Serial No. 587,827.

*To all whom it may concern:*

Be it known that I, RICHARD ULLRICH, citizen of the Republic of Austria, residing at Wels, Austria, have invented certain new and useful Improvements in Electric Heaters, of which the following is a specification.

The object of the invention is a cooking apparatus heated by electric current with an automatic device for making and breaking the circuit operated on the principle of a float and which, when inserted into a liquid, is raised by buoyancy and thereby closes the circuit. When the apparatus is removed from the liquid the float drops and breaks the circuit. The invention is especially applicable to electric cooking apparatus which are immersed in the liquid to be heated. Such apparatus had up to this time the drawback that the current passed through the body of the heater when not immersed in the liquid and therefor there was danger that the apparatus might become unduly hot, and be injured. These drawbacks are obviated by the present invention which provides for an automatic breaking of the circuit as soon as the apparatus leaves the liquid.

The same inventive idea can of course be also applied to other cooking devices, e. g. for electric cooking pots or pans in the interior of which a switch is arranged which is based on the principle of a float and which closes the circuit when the pot is filled with liquid, and which opens it as soon as the water gets too low.

In the drawings two forms of the apparatus are shown by ways of example. Fig. 1 shows in a vertical longitudinal section an immersion apparatus and Fig. 2 shows in partial section a cooking pot.

The construction of the apparatus shown in Fig. 1, provides a handle 2 for the apparatus, to which is fixed a tube 1 in which electric wires 4, 5 are arranged. The apparatus can be of any suitable construction and shape. The heating element 6 is enclosed in a casing 1$^b$ and the current path is interrupted between the contacts 7 and 8 which can have any desired shape and which close the circuit when the two contacts come together. The heating element is suitably encased in order to prevent access of liquid or vapours to the parts through which the current is passing. To this end the casing 1$^b$ and the tube 1 which are shown integral are enclosed by an outer tubular casing 3 which serves as the float and which is arranged to slide on the tube 1 within certain limits in order to rise as soon as the float is immersed in a liquid whereby contacts 7 and 8 are closed. The float slides downwardly as soon as the device is removed from the liquid whereby the contacts are opened.

The float body can be made of any suitable material and have any suitable shape. It can itself be provided with one or both of the contacting parts or it may only serve as the actuating means for closing the contacting parts or again it may actuate other means for closing the current.

In the form shown in Fig. 1, the contact 7 is of course insulated from the body 3 and is connected with the heating body 6, whereas the contact 8 is connected to the end of wire 5, and wire 4 is run directly to the heating body.

At the upper end near the handle, the float casing is open and a protecting ring 9 is provided in order to prevent entrance of materials into the interior of part 3. Ring 9 is provided with screw threads whereby to secure thereto the ribs or feet 10 upon which the apparatus is adapted to stand. The apparatus permits easy disassembling.

The inventive idea of using the buoyancy of a float for closing or opening a circuit, can of course in its details be varied without departing from the spirit of the invention. It is also possible to use any suitable means for providing water-tight connections between the different parts, such connections preventing the access of dampness of any kinds to the parts through which the current passes. Cooking pots and the like can also be provided with an automatic current interrupter based on the same principle and the arrangement in such a pot is so provided that the circuit is not closed before the liquid in the vessel reaches a certain level while the interruption takes place automatically as soon as the liquid falls below that level. The float device which actuates the contacts can either be arranged freely within the vessel, or it can be arranged in a float chamber as shown in Fig. 2, wherein the float 3$^a$ closes the contacts 7 and 8 as soon as it is raised upwardly by the buoyancy of the liquid placed into the vessel. The contacts are of course secured in any suitable way against access of the liquid to the contacts itself.

What I claim by Letters Patent is:

1. An electric immersion fluid heating device comprising a resistance element, a casing therefor, a buoyancy operated circuit breaker, a casing for the circuit breaker, the last said casing being buoyancy operated, and operated solely by its own weight when in upright position, to break the circuit.

2. A device according to claim 1, said casings having elongated necks, a handle for the device, and means positioned at the handle, for supporting the device in upright position.

3. A device according to claim 2, said elongated necks receiving lead-in wires for the heating element, said supporting means keeping the casings spaced from contact with the implement with which used, when the device is in vertical position.

4. An electric immersion fluid heating device comprising an inner and an outer casing having elongated telescoping portions, a handle for the casings, a support for maintaining the casings out of contact with the walls of a container with which used, a resistance element and a contact carried by the inner casing and connected to lead-in wires, a contact carried by the outer casing, said outer casing operating solely by its own weights to break the contact and being operated by buoyancy to make the contact, said casings having interengaging movement limiting shoulders.

5. A device according to claim 4, the outer casing sliding on the inner casing at their telescoping portions.

6. A device according to claim 4, said two casings and handle forming a completely enclosed heating unit.

In testimony whereof I have signed my name to this specification.

RICHARD ULLRICH.

Witnesses:
CARL COUDENBURY,
HENRY W. MYERS, Jr.